(12) United States Patent
Ahn et al.

(10) Patent No.: US 7,241,040 B2
(45) Date of Patent: Jul. 10, 2007

(54) BACKLIGHT ASSEMBLY AND LIQUID CRYSTAL DISPLAY APPARATUS HAVING THE SAME

(75) Inventors: Seung-Ho Ahn, Suwon-si (KR); Hee-June Kwak, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 67 days.

(21) Appl. No.: 10/909,551

(22) Filed: Aug. 2, 2004

(65) Prior Publication Data
US 2005/0024847 A1 Feb. 3, 2005

(30) Foreign Application Priority Data
Aug. 2, 2003 (KR) .................. 10-2003-0053647

(51) Int. Cl.
*F21V 7/04* (2006.01)
(52) U.S. Cl. .............. 362/612; 362/601; 362/608; 362/613
(58) Field of Classification Search ........... 362/612, 362/615, 617, 621, 555, 561, 608, 601, 613; 349/61, 65, 68; 385/901
See application file for complete search history.

(56) References Cited

U.S. PATENT DOCUMENTS

| | | | | |
|---|---|---|---|---|
| 6,582,095 | B1 * | 6/2003 | Toyoda | 362/235 |
| 6,672,733 | B2 * | 1/2004 | Nagatani | 362/614 |
| 6,842,204 | B1 * | 1/2005 | Johnson | 349/74 |
| 6,913,366 | B2 * | 7/2005 | Lee | 362/628 |
| 6,976,779 | B2 * | 12/2005 | Ohtsuki et al. | 362/608 |
| 2005/0007753 | A1 * | 1/2005 | Van Hees et al. | 362/31 |

\* cited by examiner

*Primary Examiner*—Sandra O'Shea
*Assistant Examiner*—James W Cranson, Jr.
(74) *Attorney, Agent, or Firm*—Cantor Colburn LLP (57) ABSTRACT

A backlight assembly includes a light supplying part and a light guide plate. The light supplying part includes a white light source and a monochromatic light source that generates a monochromatic light. The white light source generates a white light responsive to an electric power provided from exterior to the backlight assembly. The light guide plate is disposed adjacent to a side of the light supplying part. The light guide plate includes a light guiding region where the white light and the monochromatic light are guided into and a peripheral region that surrounds the light guiding region. Therefore, color reproducibility of an LCD apparatus is increased so that an image display quality of the LCD apparatus is improved.

32 Claims, 6 Drawing Sheets

BACKLIGHT ASSEMBLY AND LIQUID CRYSTAL DISPLAY APPARATUS HAVING THE SAME

CROSS-REFERENCE OF RELATED APPLICATIONS

The present application claims priority from Korean Patent Application No. 2003-53647, filed on Aug. 2, 2003, the disclosure of which is hereby incorporated herein by reference in its entirety.

BACKGROUND OF THE INVENTION

1. Field of the Invention

The present invention relates to a backlight assembly and a liquid crystal display (LCD) apparatus having the backlight assembly. More particularly, the present invention relates to a backlight assembly capable of improving color reproducibility to improve an image display quality and an LCD apparatus having the backlight assembly.

2. Description of the Related Art

An LCD apparatus, in general, includes an LCD panel and a backlight assembly. The backlight assembly supplies the LCD panel with a light. The LCD panel displays an image using the light.

The backlight assembly includes a light source that generates the light. The light source includes a cold cathode fluorescent lamp (CCFL), a light emitting diode (LED), etc.

A size of the LED is smaller than that of the CCFL. The LED is a point light source. A small LCD apparatus that may be several inches has the LED as the light source.

The small LCD apparatus includes a white LED that generates a white light. In general, a portion of the white light, which corresponds to a predetermined wavelength, has a lower luminance than a remaining portion of the white light. When the portion of the white light, which corresponds to the predetermined wavelength, has the lower luminance than the remaining portion of the white light, a color reproducibility of the small LCD apparatus is decreased so that an image display quality of the small LCD apparatus is deteriorated.

BRIEF SUMMARY OF THE INVENTION

The present invention provides a backlight assembly capable of improving an image display quality.

The present invention also provides a liquid crystal display (LCD) apparatus having the above-mentioned backlight assembly.

A backlight assembly in accordance with an exemplary embodiment of the present invention includes a light supplying part and a light guide plate. The light supplying part includes a white light source and a monochromatic light source that generates a monochromatic light. The white light source generates a white light responsive to an electric power provided from exterior to the backlight assembly. The light guide plate is disposed adjacent to a side of the light supplying part. The light guide plate includes a light guiding region where the white light and the monochromatic light are guided into and a peripheral region that surrounds the light guiding region.

An LCD apparatus in accordance with an exemplary embodiment of the present invention includes an LCD panel, a light supplying part and a light guide plate. The liquid crystal display panel displays an image using a white light and a monochromatic light. The light supplying part includes a white light source and a monochromatic light source that generates the monochromatic light. The white light source generates the white light responsive to an electric power provided from exterior to the light supplying part. The light guide plate is disposed adjacent to a side of the light supplying part. The light guide plate includes a light guiding region where the white light and the monochromatic light are guided into and a peripheral region that surrounds the light guiding region.

Therefore, the backlight assembly includes the white light source and the monochromatic light source. The monochromatic light is a same color light which has the lowest brightness among red, green and blue colors from the white light source. That is, a portion of the light generated from the white light source has lower luminance than a remaining portion of the light generated from the white light source. The monochromatic light source generates a light corresponding to the wavelength having the lower luminance. Therefore, color reproducibility of the LCD apparatus is increased so that the image display quality of the LCD apparatus is improved.

BRIEF DESCRIPTION OF THE DRAWINGS

The above and other advantages of the present invention will become more apparent by describing in detail exemplary embodiments thereof with reference to the accompanying drawings, in which.

DESCRIPTION OF THE EMBODIMENTS

It should be understood that the exemplary embodiments of the present invention described below may be varied modified in many different ways without departing from the inventive principles disclosed herein, and the scope of the present invention is therefore not limited to these particular following embodiments. Rather, these embodiments are provided so that this disclosure will be through and complete, and will fully convey the concept of the invention to those skilled in the art by way of example and not of limitation.

Hereinafter, the present invention will be described in detail with reference to the accompanying drawings.

A liquid crystal display (LCD) apparatus includes a white light emitting diode (LED) that generates a white light. The white LED includes a blue light emitting portion and a vacuum tube. The blue light emitting portion includes a semiconductor compound such as $In_iGa_jAl_kN$. A yellow fluorescent material such as $Y_3Al_5O_{12}:Ce$ is coated on the vacuum tube. Table 1 represents chromaticity coordinates of red, green and blue portions of a white light generated from the white LED.

TABLE 1

| Color | Coordinates | | |
|---|---|---|---|
| | x | y | z |
| Red | 5.05E-01 | 3.50E-01 | 1.45E-01 |
| Green | 3.44E-01 | 4.66E-01 | 1.90E-01 |
| Blue | 1.63E-01 | 2.09E-01 | 6.28E-01 |

Figure 1:
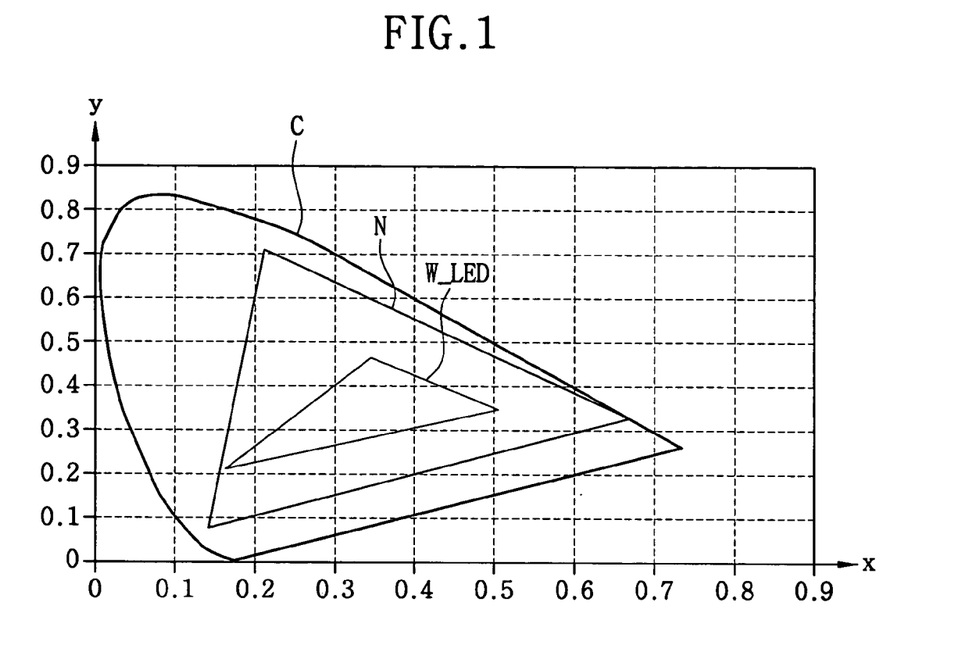
FIG. 1 is a chromaticity diagram showing colors of a white light emitting diode (LED)

FIG. 1 is a chromaticity diagram showing colors of a white light emitting diode (LED). The chromaticity diagram W_LED of the white LED is compared with a chromaticity diagram of Commission International De L'eclairege (CIE) and a chromaticity diagram of National Television System Committee (NTSC).

Referring to Table 1 and FIG. 1, color coordinates of the red, green and blue portions of the white light generated from the white LED are (5.05E-01, 3.50E-01, 1.45E-01), (3.44E-01, 4.66E-01, 1.90E-01) and (1.63E-01, 2.09E-01, 6.28E-01), respectively. The color coordinates of the red, green and blue portions of the whit light generated from the whit LED form a triangle. A color disposed in the triangle of the white LED may be displayed using the white LED.

Color coordinates of red, green and blue portions of the chromaticity diagram C of the CIE are (5.05E-01, 3.50E-01, 1.45E-01), (3.44E-01, 4.66E-01, 1.90E-01) and (1.63E-01, 2.09E-01, 6.28E-01), respectively.

Color coordinates of red, green and blue portions of the chromaticity diagram N of the NTSC are (6.700E-01, 3.300E-01), (2.100E-01, 7.100E-01) and (1.400E-01, 0.800E-01), respectively.

The chromaticity diagram C of the CIE has a horseshoe shape. The chromaticity diagram N of the NTSC has a triangular shape that is smaller than the horseshoe shape of the CIE. Therefore, the chromaticity diagram C of the CIE has wider range than the chromaticity diagram N of the NTSC so that the chromaticity diagram C of the CIE includes more various colors than the chromaticity diagram N of the NTSC.

The chromaticity diagram W_LED of the white LED has the triangular shape that is smaller than the chromaticity diagram N of the NTSC. Therefore, the chromaticity diagram W_LED of the white LED has narrower range than the chromaticity diagram N of the NTSC so that the chromaticity diagram W_LED of the white LED includes simpler colors than the chromaticity diagram N of the NTSC. In particular, an amount of the red portion of the white light generated from the white LED is smaller than that of the chromaticity diagram N of the NTSC. Therefore, the amount of the red portion of the white light generated from the white LED is smaller than that of the green portion or the blue portion of the white light generated from the white LED.

Figure 2:
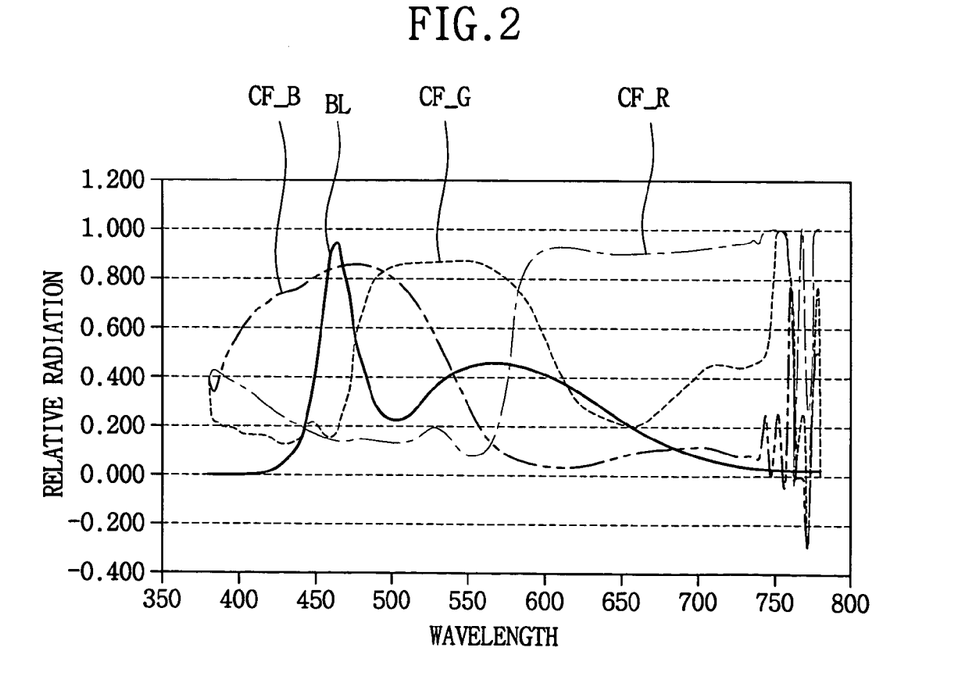
FIG. 2 is a graph showing a relationship between relative radiations and wavelength of lights that pass through red, green and blue color filters and a white light generated from a white LED.

FIG. 2 is a graph showing a relationship between relative radiations and wavelengths of lights that pass through red, green and blue color filters and a white light generated from a white LED.

Referring to FIG. 2, the wavelengths of the lights that pass through the red, green and blue color filters CF_R, CF_G and CF_B are about 600 nm to 750 nm, about 500 nm to 600 nm and about 400 nm to 500 nm, respectively.

A relative radiation of the blue portion of the light generated from the white LED (BL) is smaller than a relative radiation of the red portion of the light generated from the white LED (BL). In addition, a relative radiation of the green portion of the light generated from the white LED (BL) is smaller than a relative radiation of the red portion of the light generated from the white LED (BL). The red portion of the light generated from the white LED (BL) has the wavelength of about 600 nm to 750 nm. The blue portion of the light generated from the white LED (BL) has the wavelength of about 450 nm to 470 nm. The green portion of the light generated from the white LED (BL) has the wavelength of about 500 nm to 600 nm. The red portion of the light generated from the white LED (BL) has the wavelength of about 600 nm to 750 nm.

A red luminance of the LCD apparatus is substantially the same as a summation of the relative radiation of the light that passes through the red color filter and the relative radiation of the red portion of the white light generated from the white LED. A green luminance of the LCD apparatus is substantially the same as a summation of the relative radiation of the light that passes through the green color filter and the relative radiation of the green portion of the white light generated from the white LED. A blue luminance of the LCD apparatus is substantially the same as a summation of the relative radiation of the light that passes through the blue color filter and the relative radiation of the blue portion of the white light generated from the white LED.

The amount of the red portion of the white light generated from the white LED is smaller than that of the green portion or the blue portion of the white light generated from the white LED so that the red luminance of the LCD apparatus is smaller than the green luminance or the blue luminance of the LCD apparatus. Therefore, the red luminance of the LCD apparatus is decreased so that a color reproducibility of the LCD apparatus is decreased, thereby deteriorating an image display quality of the LCD apparatus.

Figure 3:
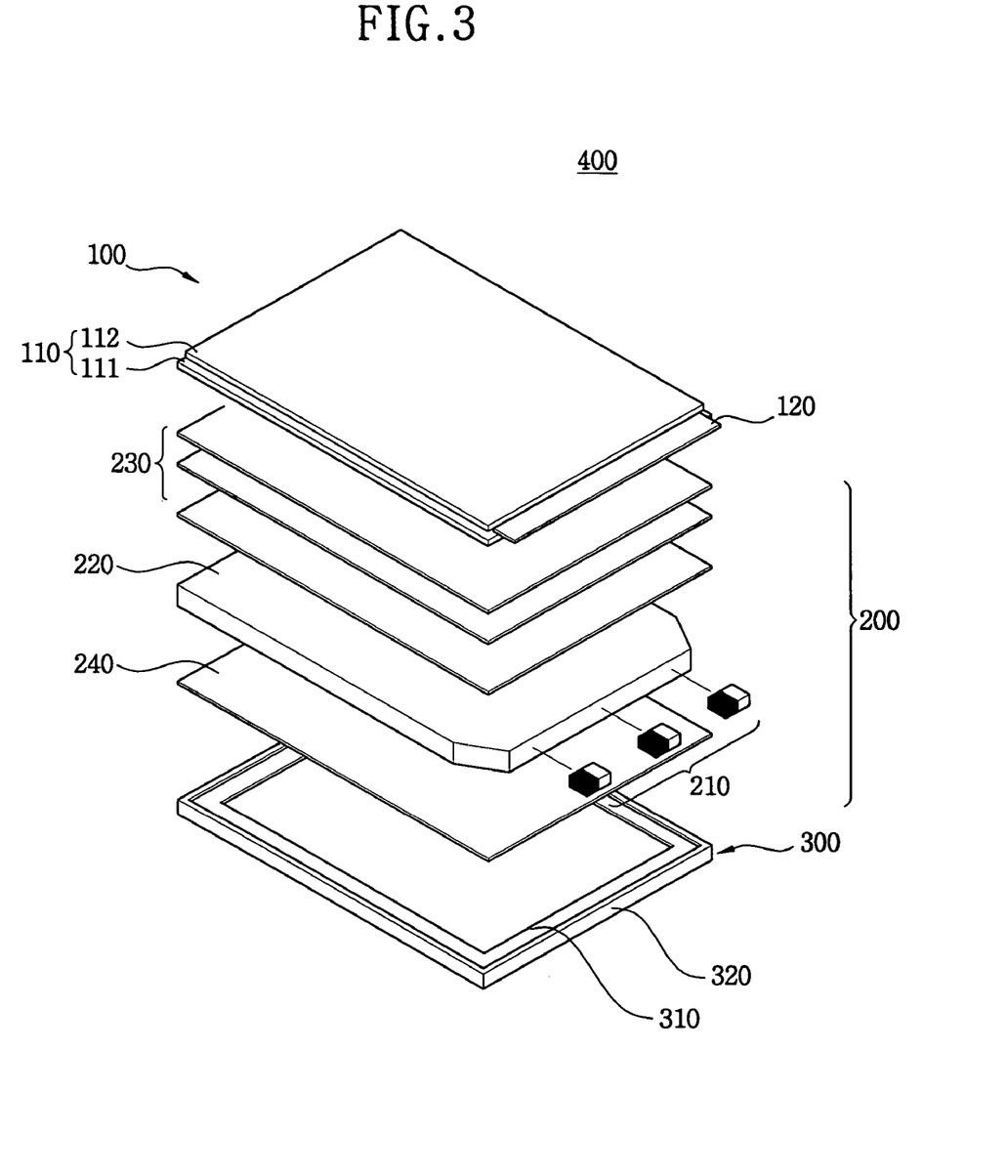
FIG. 3 is an exploded perspective view showing an LCD apparatus in accordance with an exemplary embodiment of the present invention.

FIG. 3 is an exploded perspective view showing an LCD apparatus in accordance with an exemplary embodiment of the present invention.

Referring to FIG. 3, the LCD apparatus 400 includes an LCD panel assembly 100, a backlight assembly 200 and a mold frame 300. The backlight assembly 200 generates a light. The LCD panel assembly 100 displays an image using the light. The mold frame 300 receives the LCD panel assembly 100 and the backlight assembly 200.

The LCD panel assembly 100 includes an LCD panel 110 and a flexible circuit board 120. The LCD panel 110 receives an image signal that is provided from exterior through the flexible circuit board 120 to display the image.

The LCD panel 110 includes a thin film transistor (TFT) substrate 111, a color filter substrate 112 and a liquid crystal layer (not shown). The color filter substrate 112 corresponds to the TFT substrate 111. The liquid crystal layer (not shown) is disposed between the TFT substrate 111 and the color filter substrate 112.

The TFT substrate 111 includes a first transparent plate and a switching element. The switching element is formed on the first transparent plate. The TFT substrate 111 may include a plurality of the switching elements. The switching element includes a TFT. The color filter substrate 112 includes a second transparent plate and red, green and blue color filters. The red, green and blue color filters are formed on the second transparent plate to display the image based on the light. The red, green and blue color filters may be formed through a coating process, a deposition process, etc.

A data driving circuit (not shown) is formed in a source region of the TFT substrate 111. The data driving circuit (not shown) applies a data signal to the switching element. Alternatively, a plurality of the data driving circuits may be formed in the source region of the TFT substrate 111. A gate driving circuit (not shown) is formed in a gate region of the TFT substrate 111. The gate driving circuit (not shown) applies a gate signal to the switching element. Alternatively, a plurality of the gate driving circuits may be formed in the gate region of the TFT substrate 111. The data and gate driving circuits output driving signals for driving the switching element and timing signals for controlling the driving signals based on the image signal.

The flexible circuit board 120 is formed on the source region of the TFT substrate 111. The flexible circuit board 120 is electrically connected to the data and gate driving circuits to apply the image signal to the data and gate driving circuits.

The backlight assembly 200 includes a light source 210, a light guide plate 220, optical sheets 230 and a reflecting plate 240. The light source 210 generates a light. The light guide plate 220 guides the light generated from the light source 210 into the LCD panel 110. The optical sheets 230 uniformize a luminance of the light that passes through the light guide plate 220. A portion of the light that is leaked from the light guide plate 220 is reflected from the reflecting plate 240 so that the reflected light is guided into the light guide plate 220. Alternatively, the backlight assembly 200 may include a plurality of the light sources.

The light source 210 is disposed adjacent a side of the light guide plate 220. The light source 210 includes a plurality of light emitting diodes (LED). In this exemplary embodiment, the light source 210 includes a white LED and a red LED. Alternatively, the light source 210 may include a plurality of the white LEDs and a plurality of the red LEDs. The white and red LEDs are disposed alternately. Alternatively, the light source 210 may include the white LED and a green LED. The light source 210 may also include the white LED and a blue LED. The light source 210 may also include the white LED and a yellow LED.

The light guide plate 220 guides the light generated from the light source 210 into a display region of the LCD panel 110. Alternatively, the light guide plate 220 may include light guiding patterns (not shown). The light guiding patterns (not shown) are formed in a light guiding region that corresponds to the display region.

The optical sheets 230 are disposed between the light guide plate 220 and the LCD panel 110. The optical sheets 230 uniformize the luminance of the light that passes through the light guide plate 220.

The reflecting plate 240 is disposed under the light guide plate 220. The portion of the light that is leaked from the light guide plate 220 is reflected from the reflecting plate 240 so that the portion of the light is guided into the light guide plate 220, thereby improving the luminance of the LCD apparatus.

The backlight assembly 200 and the LCD panel 110 are received in the mold frame 300. The mold frame 300 includes a bottom plate 310 and a sidewall 320. The bottom plate 310 has an opening that is disposed at a central portion of the bottom plate 310. The sidewall 320 is protruded from a side of the bottom plate 310. The backlight assembly 200 is disposed on the bottom plate 310, and the LCD panel 110 is disposed on the backlight assembly 200. The flexible circuit board 120 is bent along the sidewall 320 of the mold frame 300.

Figure 4:
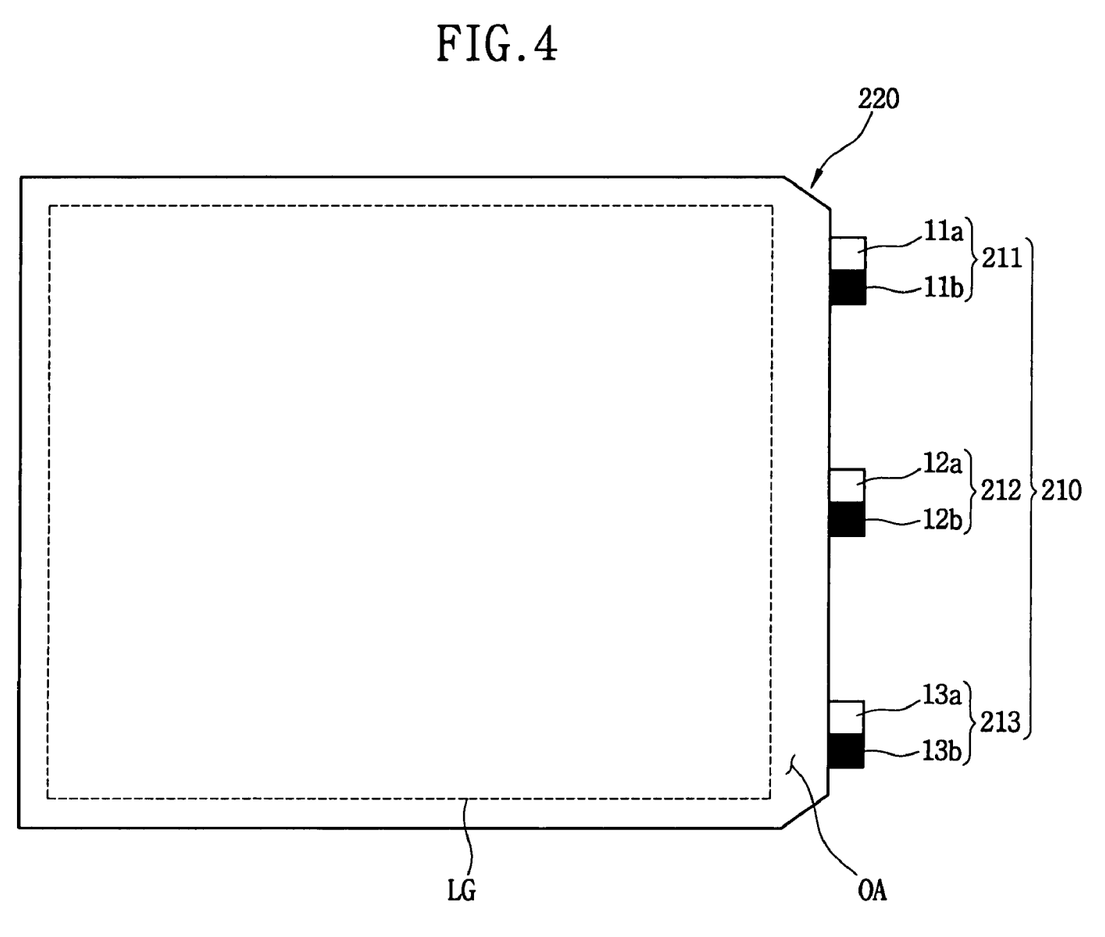
FIG. 4 is a plan view showing a light source shown in FIG. 3.

FIG. 4 is a plan view showing a light source shown in FIG. 3.

Referring to FIG. 4, the light guide plate 220 includes the light guiding region LG and a peripheral region OA. The peripheral region OA surrounds the light guiding region LG. The light source 210 is spaced apart from the light guiding region LG by the peripheral region OA.

When the light is incident into an upper side of the light guide plate 220, a portion of the light is concentrated on a portion of the light guide plate 220 adjacent to the upper side to form a bright line in the peripheral region OA. When the bright line is disposed in the peripheral region OA, the light guide region LG has more uniform luminance than the peripheral region OA, thereby uniformizing the luminance of the backlight assembly 400.

Two corners of the light guide plate 220, which are disposed adjacent to the light source 210, are chamfered so that portions of the light that is guided into the corners are reflected from the chamfered corners. Therefore, the reflected light is guided into the light guide region LG to improve the luminance of the backlight assembly 400.

The light source 210 includes a first light emitting unit 211, a second light emitting unit 212 and a third light emitting unit 213. The first, second and third light emitting units 211, 212 and 213 are spaced apart from one another.

The first light emitting unit 211 includes a first white LED 11a and a first red LED 11b. The second light emitting unit 212 includes a second white LED 12a and a second red LED 12b. The third light emitting unit 213 includes a third white LED 13a and a third red LED 13b.

Each of the first, second and third white LEDs 11a, 12a and 13a generates a white light responsive to a voltage that is provided from exterior to the light source 210. Each of the first, second and third white LEDs 11a, 12a and 13a includes a blue light emitting portion and a vacuum tube. The blue light emitting portion includes a semiconductor compound such as $In_iGa_jAl_kN$. A yellow fluorescent material such as $Y_3Al_5O_{12}:Ce$ is coated on the vacuum tube.

Each of the first, second and third red LEDs 11b, 12b and 13b generates a red light responsive to the voltage applied thereto.

In this exemplary embodiment, the LCD apparatus 400 includes three white LEDs 11a, 12a and 13a and three red LEDs 11b, 12b and 13b. Alternatively, number of the LEDs may be changed in accordance with a size of the LCD panel 110. Number of the light emitting units may also be varied in accordance with the number of the LEDs. The first, second and third white LEDs 11a, 12a and 13a and the first, second and third red LEDs 11b, 12b and 13b are disposed alternately. Therefore, portions of lights generated from the first, second and third white LEDs 11a, 12a and 13a and the first, second and third red LEDs 11b, 12b and 13b are mixed with one another so that the light having the mixed portions of the lights is guided into the light guide plate 220.

The voltages applied to the LEDs are adjusted so that relative luminances of red, green and blue portions of the light are controlled. A ratio of the relative luminances of the red, green and blue portions of the light may be about 3:6:1.

In this exemplary embodiment, the LCD apparatus 400 includes the white LEDs and the red LEDs. Each of the red LEDs is a monochromatic LED. A color of the monochromatic LED is determined by the white light that is generated from each of the white LEDs. When an amount of a green portion of the white light generated from the white LED is smaller than that of a red portion or a blue portion of the white light generated from the white LED, the light source 210 includes the white LEDs and green LEDs. In addition, when an amount of the blue portion of the white light generated from the white LED is smaller than that of the red portion or the green portion of the white light generated from the white LED, the light source 210 includes the white LEDs and blue LEDs.

In this exemplary embodiment, the light source 210 includes the white LEDs and the red LEDs, and the white LEDs and the red LEDs are disposed alternately. Therefore, the red luminance of the LCD apparatus 400 is increased so that the color reproducibility of the LCD apparatus 400 is improved and the LCD apparatus 400 may display a primary color, thereby improving the image display quality of the LCD apparatus 400.

Figure 5:
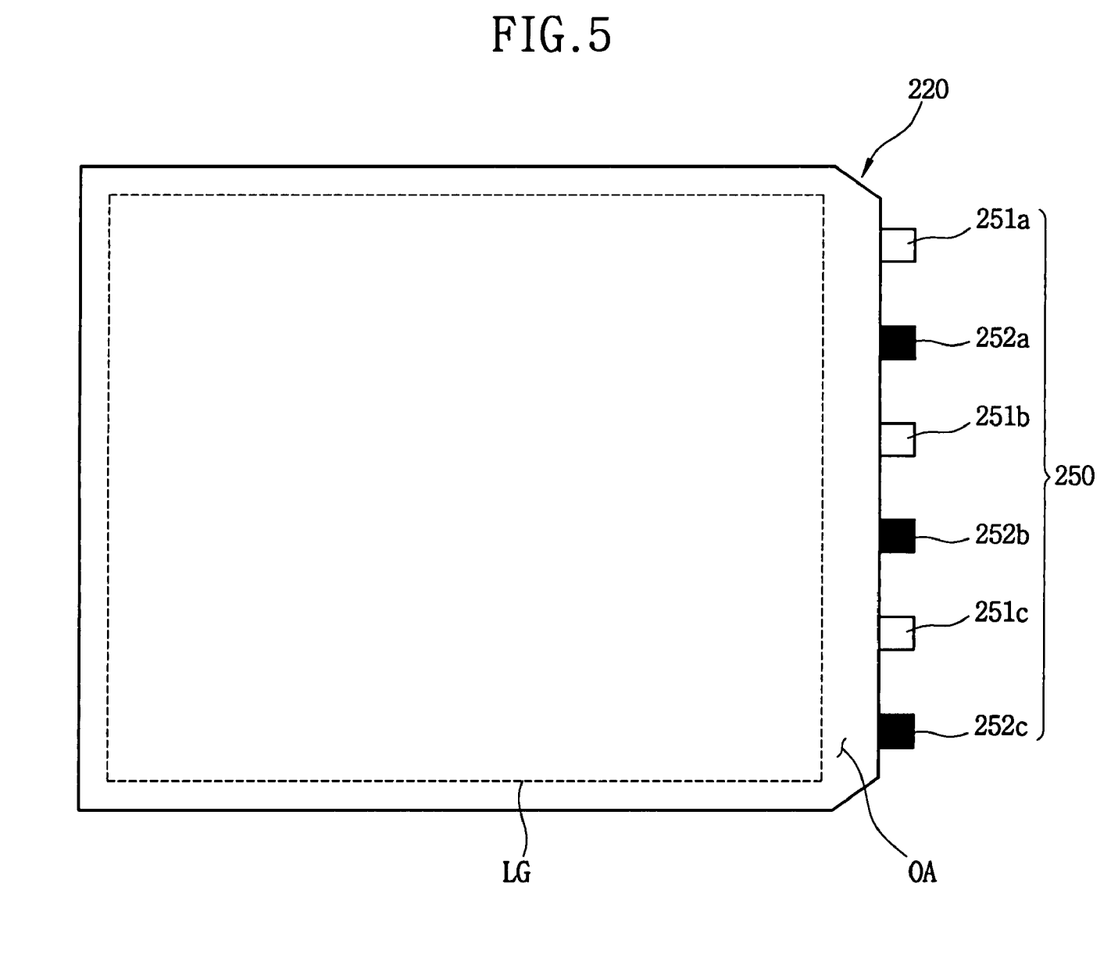
FIG. 5 is a plan view showing a light source in accordance with another exemplary embodiment of the present invention.

FIG. 5 is a plan view showing a light source in accordance with another exemplary embodiment of the present invention. The liquid crystal display apparatus of FIG. 5 is same as in FIGS. 3 and 4 except for a light source. Thus, the same reference numerals will be used to refer to the same or like parts as those described in FIGS. 3 and 4 and any further explanation will be omitted.

Referring to FIG. 5, the light source 250 is disposed adjacent to a side of a light guide plate 220. The light source 250 includes a first white LED 251a, a second white LED 251b, a third white LED 251c, a first red LED 252a, a second red LED 252b and a third red LED 252c.

Each of the first, second and third white LEDs 251a, 251b and 251c generates a white light responsive to a voltage that is provided from exterior to the light source 250. Each of the first, second and third white LEDs 251a, 251b and 251c includes a blue light emitting portion and a vacuum tube. The blue light emitting portion includes a semiconductor compound such as $In_iGa_jAl_kN$. A yellow fluorescent material such as $Y_3Al_5O_{12}$:Ce is coated on the vacuum tube.

Each of the first, second and third red LEDs 252a, 252b and 252c generates a red light responsive to the voltage.

In this exemplary embodiment, the light source 250 includes three white LEDs 251a, 251b and 251c and three red LEDs 252a, 252b and 252c. Alternatively, number of the LEDs may be varied in accordance with a size of the LCD panel 110. The first, second and third white LEDs 251a, 251b and 251c and the first, second and third red LEDs 252a, 252b and 252c are disposed alternately adjacent to a side of the light guide plate 220.

Therefore, the first red LED 252a is disposed between the first and second white LEDs 251a and 251b. The second red LED 252b is disposed between the second and third white LEDs 251b and 251c. The third white LED 251c is disposed between the second red LED 252b and the third red LED 252c.

Portions of lights generated from the first, second and third white LEDs 251a, 251b and 251c and the first, second and third red LEDs 252a, 252b and 252c are mixed with one another so that a light that has the mixed portions of the lights is guided into the light guide plate 220.

In this exemplary embodiment, the light source 250 includes the white LEDs and the red LEDs. Each of the red LEDs is the monochromatic LED. A color of the monochromatic LED is determined by the white light that is generated from each of the white LEDs. When an amount of a green portion of the white light generated from the white LED is smaller than that of a red portion or a blue portion of the white light generated from the white LED, the light source 250 includes the white LEDs and green LEDs. In addition, when an amount of the blue portion of the white light generated from the white LED is smaller than that of the red portion or the green portion of the white light generated from the white LED, the light source 250 includes the white LEDs and blue LEDs.

Figure 6:
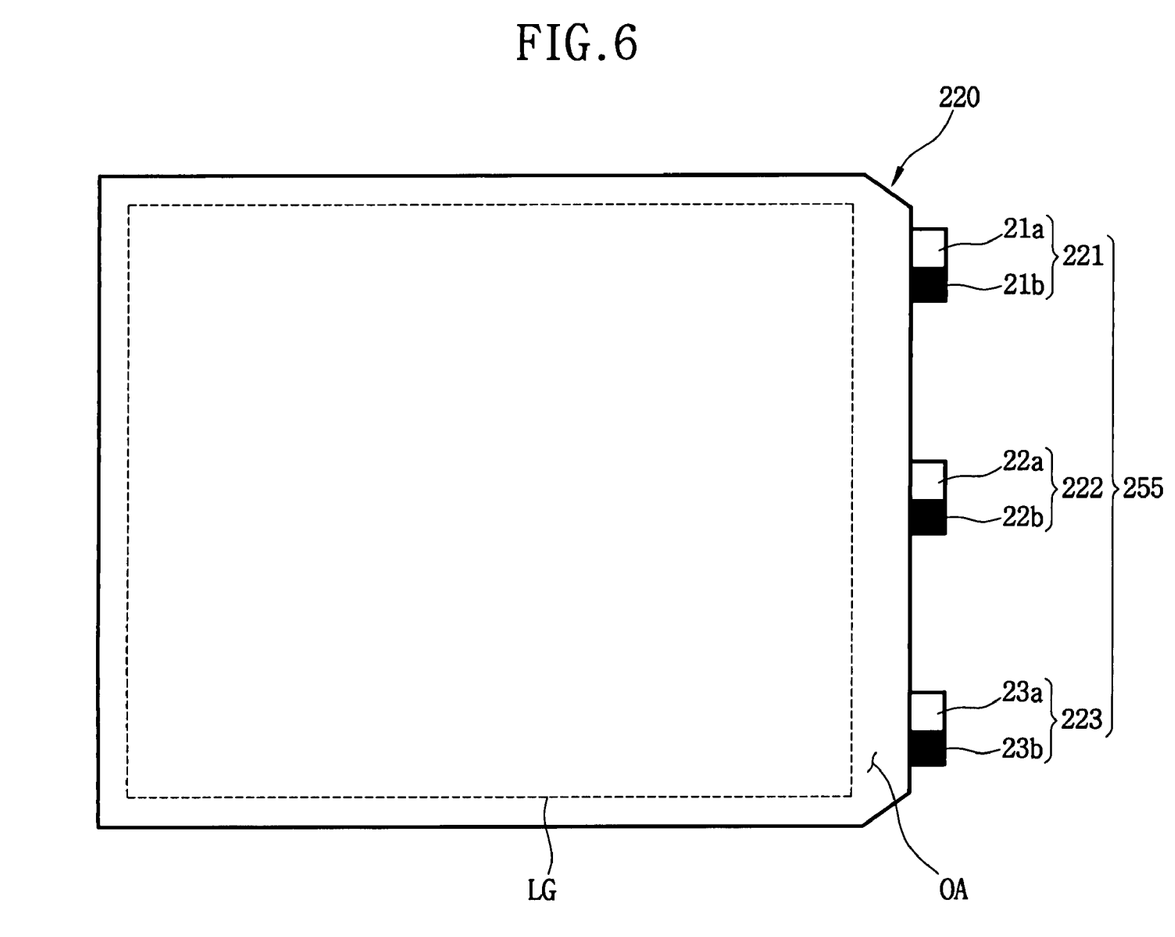
FIG. 6 is a plan view showing a light source in accordance with another exemplary embodiment of the present invention.

FIG. 6 is a plan view showing a light source in accordance with another exemplary embodiment of the present invention. A liquid crystal display apparatus of FIG. 6 is same as in FIGS. 3 and 4 except for a light source. Thus, the same reference numerals will be used to refer to the same or like parts as those described in FIGS. 3 and 4 and any further explanation will be omitted.

Referring to FIG. 6, the light source 255 includes a first light emitting unit 221, a second light emitting unit 222 and a third light emitting unit 223. The first light emitting unit 221 includes a first white LED 21a and a first red LED 21b. The second light emitting unit 222 includes a second white LED 22a and a second red LED 22b. The third light emitting unit 223 includes a third white LED 23a and a third red LED 23b.

A size of each of the first, second and third white LEDs 21a, 22a and 23a is larger than that of each of the first, second and third red LEDs 21b, 22b and 23b. In addition, an amount of a voltage applied to each of the first, second and third white LEDs 21a, 22a and 23a is larger than that of a voltage applied to each of the first, second and third red LEDs 21b, 22b and 23b. Therefore, a luminance of a light generated from each of the first, second and third white LEDs 21a, 22a and 23a is larger than that of a light generated from each of the first, second and third red LEDs 21b, 22b and 23b.

According to this exemplary embodiment, the size of each of the LEDs and the voltage applied to each of the LEDs are adjusted to control the luminance of the light generated from each of the LEDs.

Figure 7:
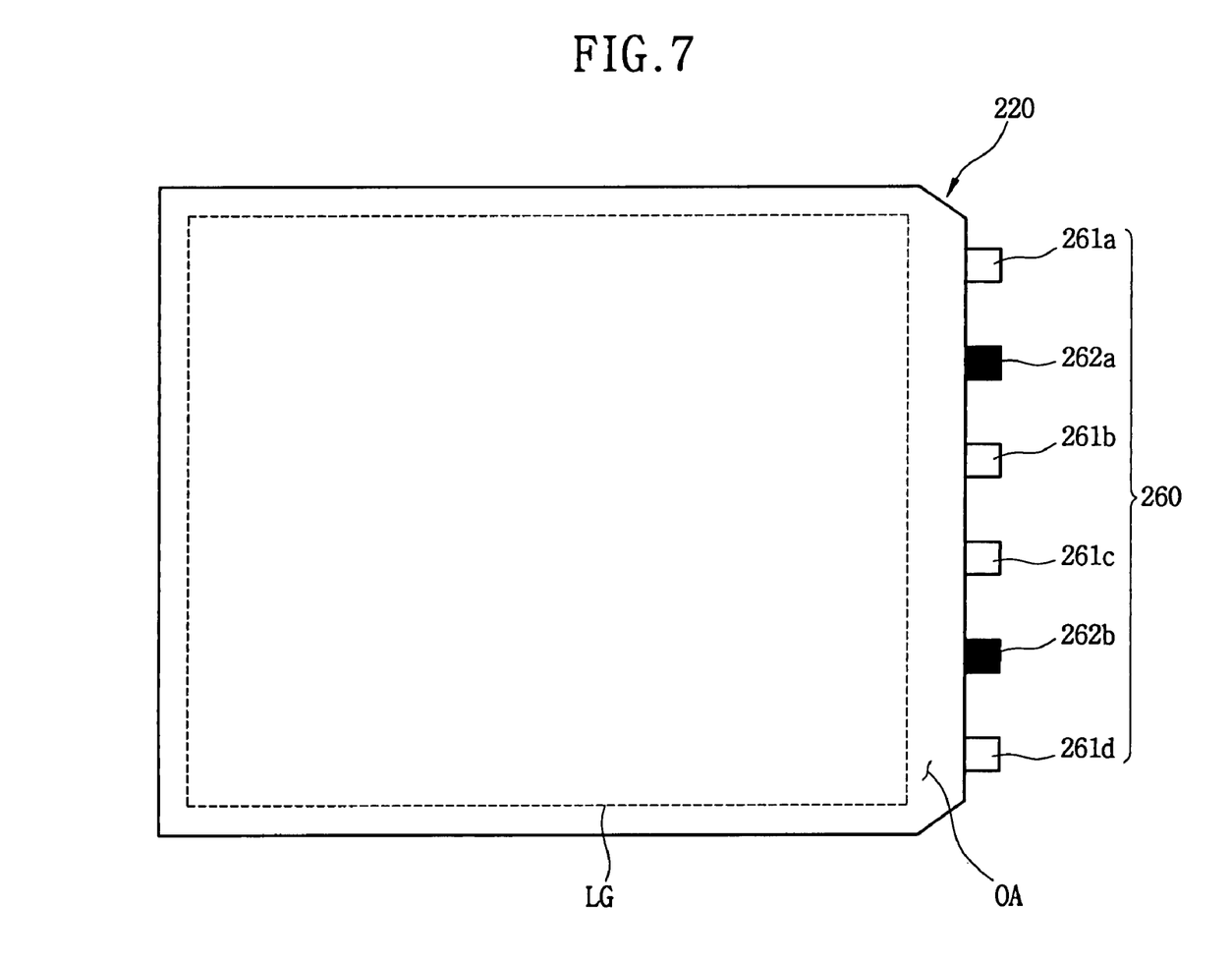
FIG. 7 is a plan view showing a light source in accordance with another exemplary embodiment of the present invention.

FIG. 7 is a plan view showing a light source in accordance with another exemplary embodiment of the present invention. The liquid crystal display apparatus of FIG. 7 is same as in FIGS. 3 and 4 except for a light source. Thus, the same reference numerals will be used to refer to the same or like parts as those described in FIGS. 3 and 4 and any further explanation will be omitted.

Referring to FIG. 7, the light source 260 is disposed adjacent to a side of a light guide plate 220. The light source 260 includes a first white LED 261a, a second white LED 261b, a third white LED 261c, a fourth white LED 261d, a first red LED 262a and a second red LED 262b.

The first red LED 262a is disposed between the first and second white LEDs 261a and 261b. The second red LED 262b is disposed between the third and fourth white LEDs 261c and 261d. The second white LED 261b is disposed adjacent to the third white LED 261c.

Portions of lights generated from the first, second, third and fourth white LEDs 261a, 261b, 261c and 261d, the first red LED 262a and the second red LED 262b are mixed with one another so that a light that has the mixed portions of the lights is guided into the light guide plate 220.

According to this exemplary embodiment, number of the white LEDs 261a, 261b, 261c and 261d and number of the red LEDs 262a and 262b are adjusted to improve color reproducibility of the LCD apparatus.

According to the present invention, the LCD apparatus includes the backlight assembly having the white light source and the monochromatic light source. The monochromatic light source generates a light corresponding to the wavelength having a lower luminance. Therefore, color reproducibility of the LCD apparatus is increased so that the image display quality of the LCD apparatus is improved.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A backlight assembly used in a display device having a color filter, the backlight assembly comprising:
a light supplying part including a white light source generating white light and a monochromatic light source generating monochromatic light responsive to electric power provided from exterior to the backlight assembly; and
a light guide plate disposed adjacent to a side of the light supplying part, the light guide plate including a light guiding region where the white light and the monochromatic light are guided into and a peripheral region that surrounds the light guiding region,
wherein the monochromatic light and the white light generated from the light supplying part are directly incident into the light guide plate,
wherein the color filter is disposed facing the light guiding region; and
wherein the monochromatic light has a substantially same color as the color filter.

2. The backlight assembly of claim 1, wherein the light supplying part comprises a light emitting unit, the light emitting unit having the white and monochromatic light sources together.

3. The backlight assembly of claim 2, wherein the light supplying part further comprises one or more light emitting units spaced apart from one another.

4. The backlight assembly of claim 2, wherein an amount of the white light is larger than an amount of the monochromatic light.

5. The backlight assembly of claim 1, wherein the light supplying part comprises a plurality of the white light sources and a plurality of the monochromatic light sources, and the white light sources and the monochromatic light sources are disposed alternately.

6. The backlight assembly of claim 5, wherein the white light sources and the monochromatic light sources are spaced apart from one another.

7. The backlight assembly of claim 5, wherein a number of the white light sources is equal to a number of the monochromatic light sources.

8. The backlight assembly of claim 5, wherein a number of the white light sources is larger than a number of the monochromatic light sources.

9. The backlight assembly of claim 1, wherein a corner disposed in the peripheral region adjacent to the light supplying unit is chamfered.

10. The backlight assembly of claim 1, wherein the monochromatic light is a same color light which has the lowest brightness among red, green and blue colors from the white light source.

11. The backlight assembly of claim 10, wherein the monochromatic light is one of the red, green or blue color lights.

12. The backlight assembly of claim 1, wherein the light source comprises a light emitting diode.

13. A liquid crystal display apparatus comprising:
a light supplying part including a white light source generating white light and a monochromatic light source generating monochromatic light responsive to electric power provided from exterior to the light supplying part;
a light guide plate disposed adjacent to a side of the light supplying part, the light guide plate including a light guiding region where the white light and the monochromatic light are guided into and a peripheral region that surrounds the light guiding region; and
a liquid crystal display panel including a color filter to display an image using the white light and the monochromatic light having a substantially same color as the color filter, wherein the color filter is disposed facing the light guiding region,
wherein the monochromatic light and the white light generated from the light supplying part are directly incident into the light guide plate.

14. The liquid crystal display apparatus of claim 13, wherein the light supplying part comprises a light emitting unit, the light emitting unit having the white and monochromatic light sources together.

15. The liquid crystal display apparatus of claim 14, wherein the light supplying part further comprises one or more light emitting units spaced apart from one another.

16. The liquid crystal display apparatus of claim 13, wherein the light supplying part comprises a plurality of the white light sources and a plurality of the monochromatic light sources, and the white light sources and the monochromatic light sources are disposed alternately.

17. The liquid crystal display apparatus of claim 16, wherein the white light sources and the monochromatic light sources are spaced apart from one another.

18. The liquid crystal display apparatus of claim 13, wherein a corner disposed in the peripheral region adjacent to the light supplying unit is chamfered.

19. The liquid crystal display apparatus of claim 13, wherein the monochromatic light has the same color light that is lowest brightness in red, green and blue color lights from the white light source.

20. The liquid crystal display apparatus of claim 13, wherein the light source comprises a light emitting diode.

21. The backlight assembly of claim 1, wherein the white light source and the monochromatic light source are arranged substantially in parallel with a horizontal direction of the light guide plate.

22. The backlight assembly of claim 2, wherein the white and monochromatic light sources are without space between each other.

23. The liquid crystal display apparatus of claim 13, wherein the white light source and the monochromatic light source are arranged substantially in parallel with a horizontal direction of the light guide plate.

24. The liquid crystal display apparatus of claim 14, wherein the white and monochromatic light sources are without space between each other.

25. The backlight assembly of claim 9, wherein the light supplying part is between two chamfered corners.

26. The liquid crystal display apparatus of claim 18, wherein the light supplying part is between two chamfered corners.

27. The backlight assembly of claim 1, wherein the color filter is disposed facing the light guiding region and over the light guide plate.

28. The backlight assembly of claim 1, wherein the color filter transmits light having substantially the same wavelength range as the monochromatic light.

29. The liquid crystal display apparatus of claim 13, wherein the color filter is disposed facing the light guiding region and over the light guide plate.

30. The liquid crystal display apparatus of claim 13, wherein the color filter transmits light having substantially the same wavelength range as the monochromatic light.

31. The backlight assembly of claim 1, wherein the light guide plate further includes a light emitting surface, the color filter being disposed facing the light emitting surface.

32. The liquid crystal display apparatus of claim 13, wherein the light guide plate further includes a light emitting surface, the color filter being disposed facing the light emitting surface.

* * * * *